United States Patent [19]

Stenger

[11] Patent Number: 5,035,798
[45] Date of Patent: Jul. 30, 1991

[54] FILTRATION VESSEL AND END CAP LOCK BY A FLEXIBLE ROD

[76] Inventor: Lawrence Stenger, 20 W. Plumosa La., Lake Worth, Fla. 33467

[21] Appl. No.: 494,981

[22] Filed: Mar. 16, 1990

[51] Int. Cl.$^5$ ............................................. B01D 27/08
[52] U.S. Cl. .................... 210/232; 210/282; 29/525.1; 215/341; 215/346; 215/352; 220/323
[58] Field of Search ............ 29/408, 410, 525.1; 24/DIG. 26; 292/DIG. 64; 215/291, 341, 346, 352; 220/315, 319, 323, 434; 70/165; 210/232, 264, 282

[56] References Cited

U.S. PATENT DOCUMENTS

| | | | |
|---|---|---|---|
| 1,477,043 | 12/1923 | Drake | 220/323 |
| 1,974,539 | 9/1934 | Le Comte | 220/323 |
| 4,781,830 | 11/1988 | Olsen | 210/232 |

*Primary Examiner*—Robert A. Dawson
*Assistant Examiner*—Wanda L. Millard

*Attorney, Agent, or Firm*—Eckert, Seamans, Cherin & Mellott

[57] ABSTRACT

A water filtration device is provided with a vessel body having an open interior for containing activated carbon used to filter water flowing through the open interior of the vessel body. The vessel body is preferably tubular with at least one open end and an end cap for closing the open end. The end cap can have an end wall and a tubular side wall dimensioned to fit over the tubular vessel body to close the open end. A circumferential groove, preferably semi-circular in cross-section, is provided on an inside surface of the side wall of the end cap. This circumferential groove mates with a circumferential groove on an outside surface of the tubular vessel body when the end cap is fitted over the open end to form a locking channel. A flexible retaining rod is inserted through an aperture in the side wall of the end cap and into the locking channel to prevent disengagement of the end cap from the vessel body. The invention provides a non-toxic alternative to toxic adhesives and other toxic materials previously used to secure end caps to the vessel body.

13 Claims, 5 Drawing Sheets

FILTRATION VESSEL AND END CAP LOCK BY A FLEXIBLE ROD

BACKGROUND OF THE INVENTION

1. Field of the Invention

This invention pertains to filtration apparatus, and more particularly to water filtration apparatus.

2. Description of the Relevant Art

Activated carbon is a common filtration medium for the adsorption and removal of organic contaminants in the purification of drinking water, and also of air. The activated carbon is typically housed within a tubular vessel body, open at each end, which ends are closed by end caps. Plastic materials are typically used to form the vessel body and the end cap because of the beneficial properties of plastics, namely, strength, durability, resistance to corrosion, ease of molding, and low cost. Polyvinyl chloride (PVC) is a commonly used plastic material for water filtration apparatus. PVC components are typically adhered together with known PVC cements.

It has been determined that PVC cements release volatile organic chemicals (VOC) as the cement cures and bonds the two PVC surfaces together. Other common methods for bonding plastics together, such as epoxy cements, thermal welding, and glues containing methylene chloride, also release VOCs during the joining process. These VOCs are considered hazardous to human and animal health according to the United States Environmental Protection Agency (EPA). The VOCs released upon curing of the adhesives, particularly in the closed environment of the interior of a water filtration device, are adsorbed onto the activated carbon contained within the vessel body. These VOCs are released into the initial water supply that passes through the vessel body and contacts the activated carbon. Tests have shown that initial VOC levels in water leaving the activated carbon can exceed the EPA standards for drinking water. An alternative, non-toxic method and apparatus for securing the components of a water filtration device is therefore necessary. Pressure levels in the filtration apparatus can reach 100 psi, and safety concerns also require that the joining method and apparatus resist rupture with pressures reaching 300 psi.

SUMMARY OF THE INVENTION

It is an object of the invention to provide a water filtration device which will eliminate the need for toxic adhesives and other fastening processes which release toxic substances onto the activated carbon contained within the water filtration device.

It is another object of the invention to provide a water filtration device having an end cap which will remain secured to a vessel body of the water filtration device at operating pressures reaching 100 psi.

It is yet another object of the invention to provide a water filtration device in which the end cap will remain secured to a vessel body of the water filtration device at burst pressures reaching 300 psi.

These and other objects are accomplished by a water filtration device having a vessel body with an open interior for containing activated carbon or another filtration medium. The vessel body is preferably tubular and has at least one open end that is closed by an end cap having an end wall and a tubular side wall that is dimensioned to fit over the open end. A groove, preferably circumferential, is provided on an inside surface of the side wall of the end cap, and a matching groove is provided on an exterior surface of the vessel body adjacent the open end. The grooves are juxtaposed when the end cap is fitted over the open end of the vessel body to form a locking channel. A flexible rod is passed through an aperture in the side wall of the end cap and into the locking channel to prevent removal of the end cap from the vessel body at internal operating pressures reaching 100 psi and burst pressures reaching 300 psi.

The circumferential locking grooves are preferably substantially semi-circular in cross-section, preferably about 180 degrees, and mate to form a locking channel that is substantially circular in cross-section when the end cap is fitted over the vessel body. Square channels can distribute disproportionate stresses at the squared edges of the channels, which stresses can cause the plastic materials forming the end caps and vessel body to crack. Semi-circular locking grooves more evenly distribute pressures about the respective surfaces of the mated grooves too prevent such cracking.

An O-ring or other suitable water sealant can be placed between adjacent portions of the vessel body and the end cap in a known manner to prevent water leakage through the joint.

BRIEF DESCRIPTION OF THE DRAWINGS

There are shown in the drawings embodiments which are presently preferred it being understood, however, that the invention is not limited to the precise arrangements and instrumentalities shown, wherein.

DETAILED DESCRIPTION OF THE PREFERRED EMBODIMENTS

Figure 1:
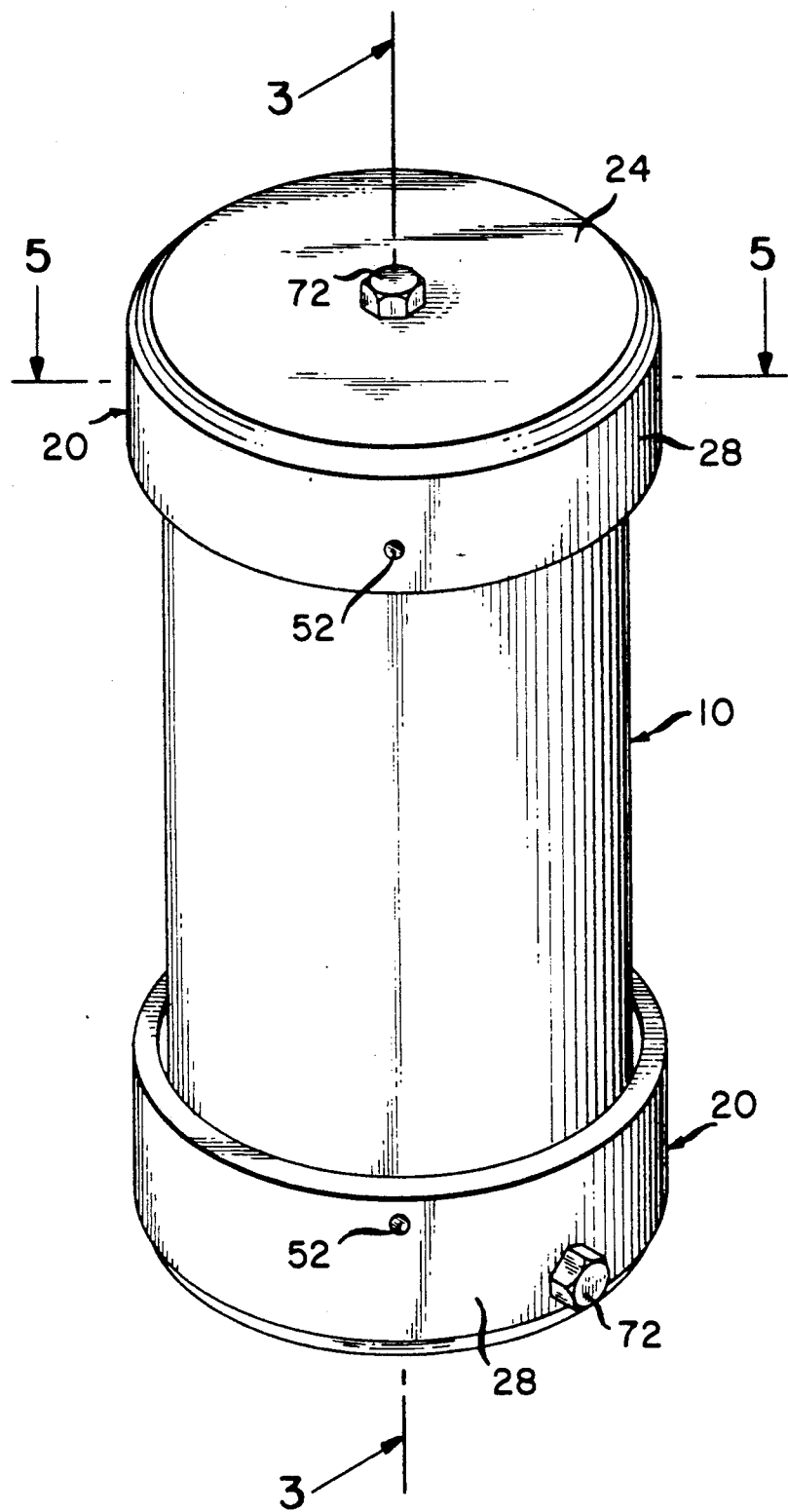
FIG. 1 is a perspective view of a water filtration device according to the invention.
Figure 2:
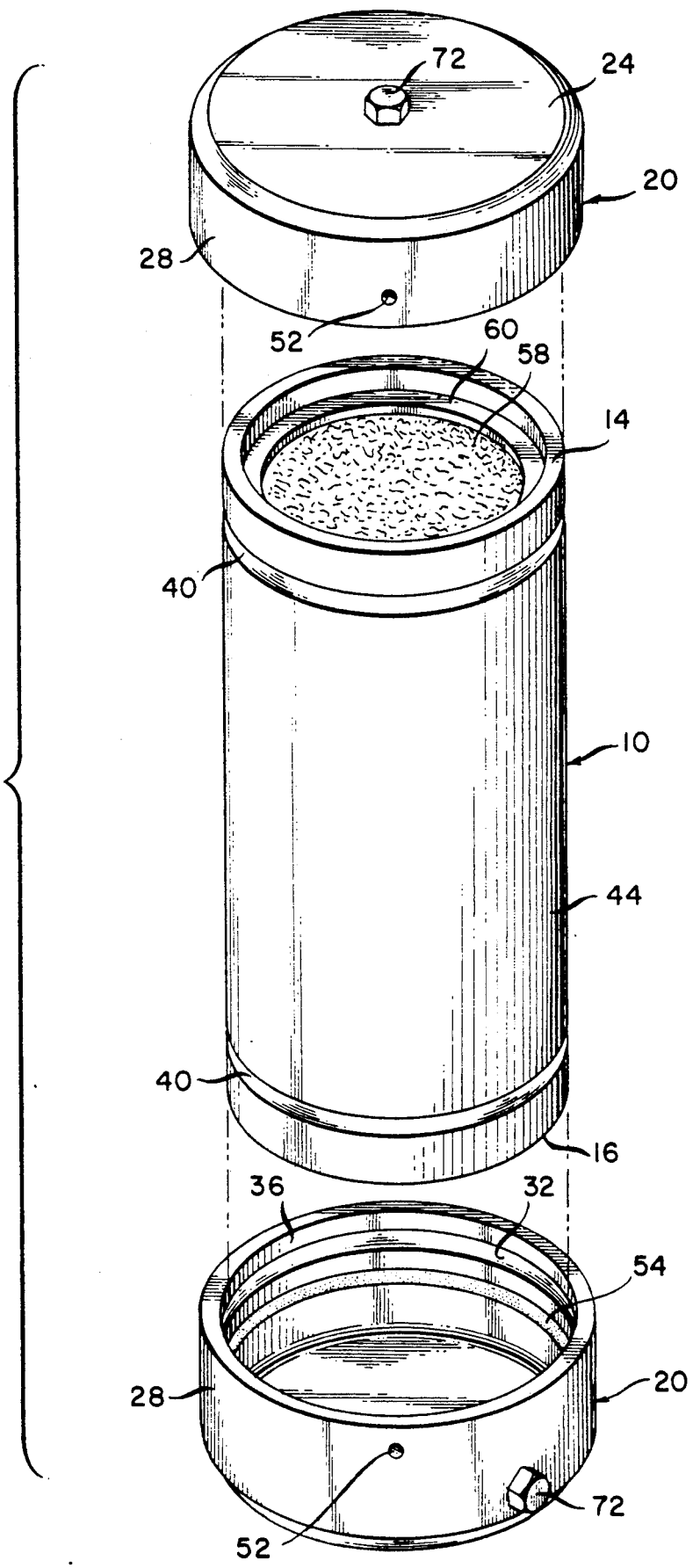
FIG. 2 is an exploded perspective view.
Figure 3:
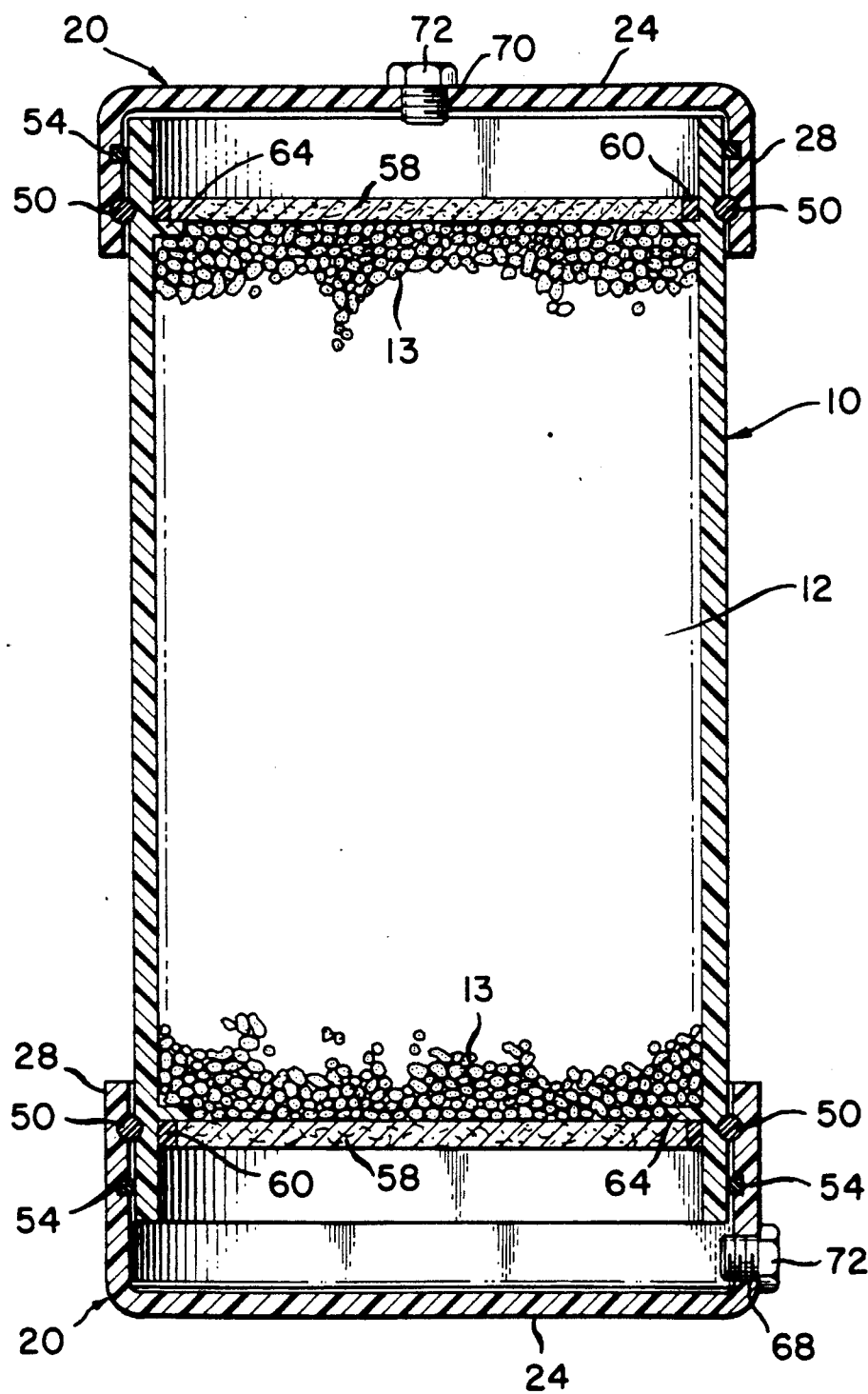
FIG. 3 is a cross-section taken along lines 3—3 in FIG. 1.

A water filtration device according to the invention will include a vessel body 10, preferably tubular as shown, and having an open interior cavity 12. Activated carbon 13 is housed within the open interior cavity 12 and is used to adsorb contaminants from water flowing through the water filtration device (FIG. 3). The tubular vessel body 10 has at least one, and preferably two, open ends 14, 16. End caps 20 are provided to close the open ends of the vessel body 10. The end caps 20 preferably include an end wall 24 and a tubular side wall 28. The inside diameter of tubular side wall 28 is greater than, but substantially equal to, the outside diameter of the vessel body 10 at the ends 14, 16. The end caps 20 will thereby fit snugly over the open ends 14, !6 in the manner depicted in FIG. 3.

A locking groove 32 is provided on an inside surface 36 of the sidewall 28 of each end cap 20 and preferably extends substantially about the circumference of the sidewall 28. A corresponding locking groove 40 is provided at an outside surface 44 of the vessel body 10, and preferably extends substantially about the circumference of the vessel body 10. The locking groove 40 will usually be provided substantially adjacent to each of the open ends 14, 16 of the vessel body 10.

Figure 4:
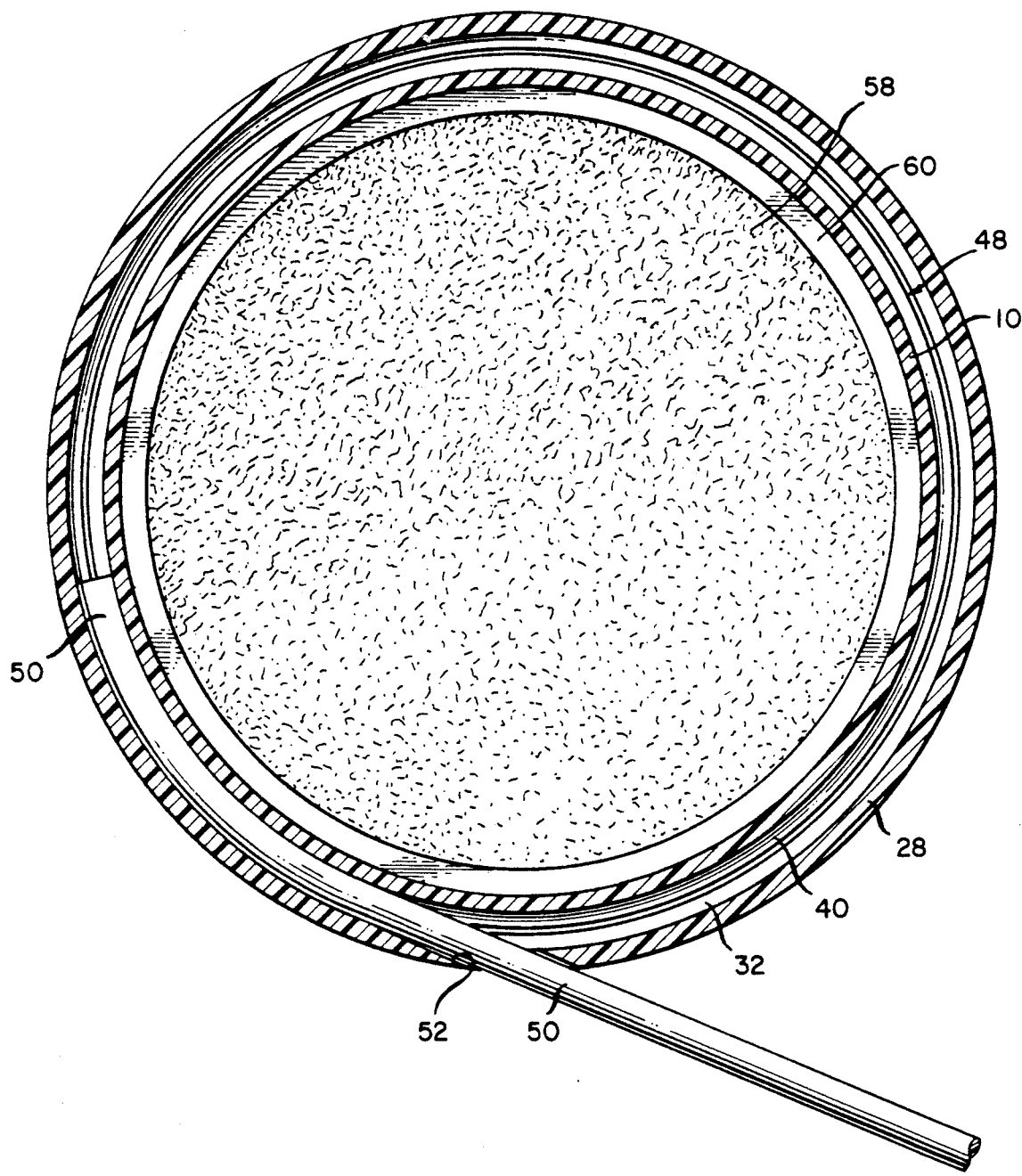
FIG. 4 is a cross-section taken along lines 4—4 in FIG. 1, and in a first configuration.
Figure 5:
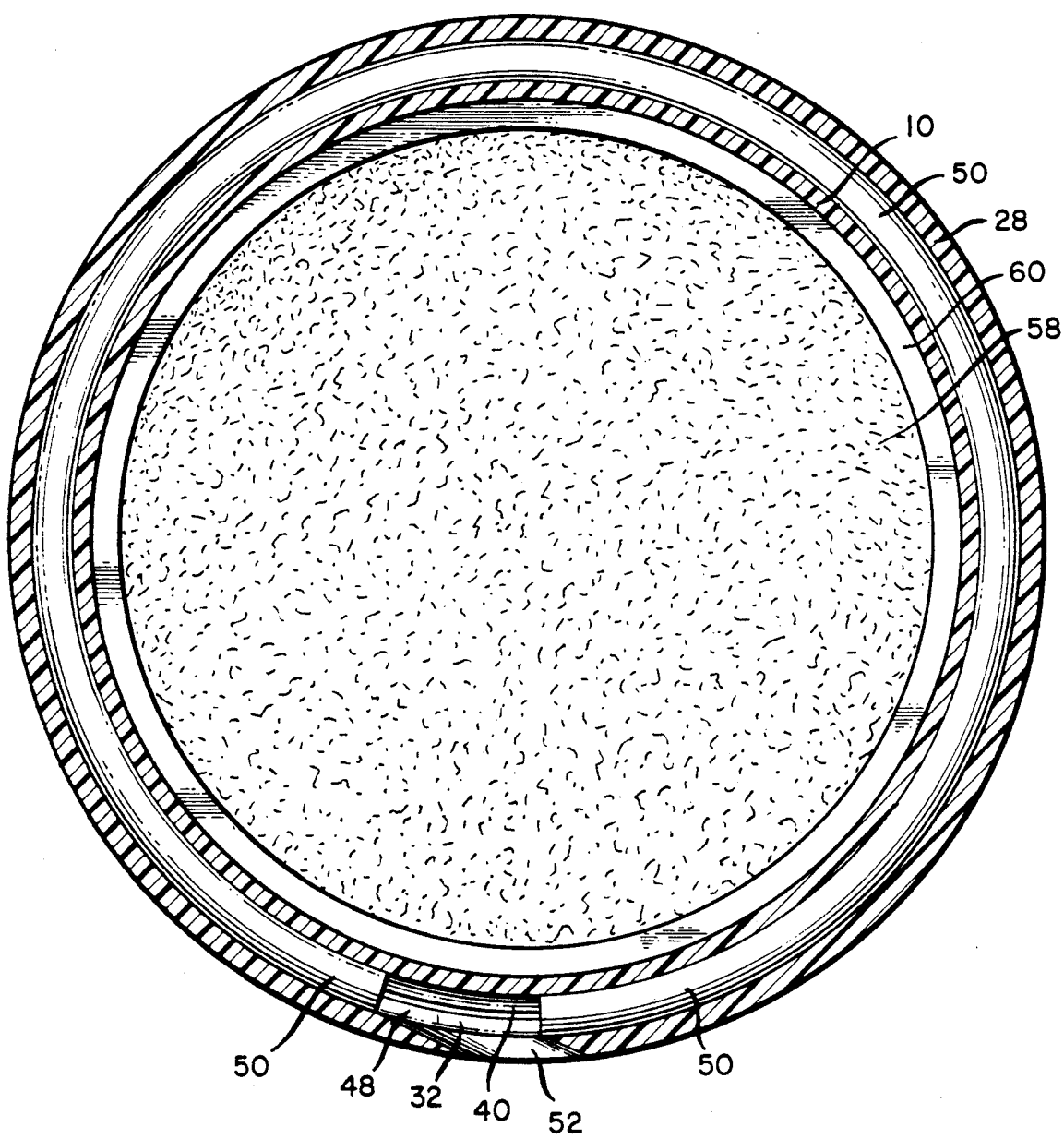
FIG. 5 is a cross-section taken along line 4—4 in FIG. 1, and in a second configuration.

The locking grooves 32 of the end caps 20 are juxtaposed next to the locking grooves 40 of the vessel body 10 when the end caps 20 are fitted over the open ends of the vessel body 10 (FIG. 5). Circumferential locking channels 48 are formed by the juxtaposition of the locking grooves FIG. 4). A flexible rod 50 is dimensioned to fit snugly within the locking channel 48 so a to prevent removal of the end caps 20 from the vessel body 10. An aperture 52 through the sidewall 28 of each end cap 20 opens into the circumferential groove 32 and permits insertion of the flexible rod 50 through the side wall 28 and into the corresponding locking channel 48 (FIG. 4). The flexible rod 50 is preferably pushed through the locking channel 48 until it substantially fills the locking channel in the manner depicted in FIG. 5. The snug fit of the flexible rod 50 in the mated locking grooves 32 and 40, and corresponding locking channel 48, prevents removal of the end cap 20 from the vessel body 10. The joint is non-toxic, and secure under operating pressures reaching 100 psi, and under internal burst pressures reaching 300 psi.

The locking grooves 32 and 40 are preferably substantially semicircular in cross-section, and preferably about 180 degrees, so as to form a locking channel 48 that is substantially circular in cross-section. The flexible rod 50 can also be substantially circular in cross-section, and has a diameter substantially equal to, but less than that of the locking channel 48. Stresses exerted on the flexible rod 50 and the surfaces of the locking grooves 32 and 40 by internal pressure within the water filtration device will be distributed evenly across the rounded surfaces of the grooves. Squared-off grooves, with a corresponding configuration for the flexible rod, tend to focus stresses at the squared edges of the channel formed by the mated grooves. These stresses can crack brittle materials such as PVC plastics. The semicircular locking grooves, forming a circular locking channel when juxtaposed, alleviate this problem by distributing stresses more evenly across the rounded surfaces of the locking channel.

The vessel body 10 and end caps 20 are preferably formed from suitable plastic materials which are strong, durable, resist corrosion, are easily molded, and are relatively low in cost. Polyvinyl chloride (PVC) is a preferred plastic material, although polypropylene, polyethylene, and other plastics with similar properties would also be suitable.

It is preferable to provide an O-ring or other water sealing device or composition between the outside surface 44 of the vessel body 10 and the inside surface 36 of the end caps 20 to prevent water leakage through the joint. O-rings 54 can be mounted in corresponding grooves formed in the interior surface 36 of the end caps 20 to provide a non-toxic, water-tight seal for the joint. Other non-toxic sealing methods and compositions are alternatively possible.

The activated carbon 13 ca be held within the vessel body 10 by any suitable structure, such as the porous filter pads 58, which can be mounted to circumferential mounting rings 60. The mounting rings 60 can engage stop flanges 64 fixed to an interior surface of the vessel body 10 to secure the filter pads 58 against movement. Other structure for containing the activated carbon is alternatively possible. Water can be passed through the water filtration device through an inlet opening 68 and an outlet opening 70, which openings can include suitable fittings 72 for connection to water supply and exit conduits.

The invention is capable of modification without departing from the spirit or essential attributes thereof.

The dimensions and configuration of the water filtration device can be varied. The placement and configuration of the locking channels can also be the subject of some modification, and the choice of materials for the vessel body, end caps, and flexible rod can be varied. Reference should, accordingly, be had to the following claims, rather than to the foregoing specification, as indicating the scope of the invention.

I claim:

1. A water filtration device, comprising:
   a vessel body having an open interior for containing a filter medium, said vessel body having at least one open end;
   an end cap comprising an end wall and a side wall, said side wall having an inside dimension substantially equal to and greater than the corresponding outside dimension of said open end, whereby said end cap will fit over the open end of the vessel body to close the open end;
   locking structure for locking the end cap to the open end of the vessel body, said locking structure comprising a locking groove on an inside surface of said side wall, with an access opening extending through said side wall to said locking groove, said locking structure further comprising a corresponding locking groove positioned on said tubular vessel body such that said locking groove on said end cap can be juxtaposed with said corresponding locking groove on said vessel body when said end cap is fitted over said open end, said juxtaposed locking grooves forming a locking channel;
   a flexible rod adapted for insertion into said locking channel through said access opening, said flexible rod being dimensioned in cross-section so as to fit snugly within said locking channel, whereby said locking grooves and said flexible rod will provide a non-toxic joint for preventing disengagement of said end caps from said vessel body under the internal operating pressure of water flowing through said water filtration device.

2. The water filtration device of claim 1, wherein said locking grooves are substantially circumferential about said end caps and said vessel body, and substantially semi-circular in cross-section, whereby said locking channel formed by juxtaposition of said circumferential grooves is substantially circumferential and circular in cross-section, said flexible rod being substantially circular in cross-section and having a diameter substantially equal to, and less than the diameter of said locking channel, whereby said flexible rod will fit snugly within said locking channel and internal pressure forces acting on said end cap will be distributed across a substantial portion of the surface area of said locking channel to prevent stress fractures.

3. The water filtration device of claim 2, further comprising seal means for forming a water tight seal between adjacent portions of said end cap and said open end of said vessel body.

4. The water filtration device of claim 3, wherein said seal means is an O-ring.

5. The water filtration device of claim 4, wherein said O-ring is mounted about an interior surface of said side wall of said end cap, said O-ring being positioned in a mounting groove.

6. The water filtration device of claim 2, wherein said vessel body and said end caps are constructed from plastic, said semi-circular locking grooves preventing stress fractures of said plastic caused by internal operating pressures within said water filtration device.

7. The water filtration device of claim 6, wherein said plastic is polyvinyl chloride.

8. The water filtration device of claim 6, wherein said filter medium is activated carbon.

9. The water filtration device of claim 2, wherein said vessel body and said sidewalls of said end caps are substantially tubular.

10. A water filtration device comprising:
   a plastic tubular vessel body containing activated carbon and having open ends;
   plastic end caps for said open ends, said end caps comprising an end wall and a tubular side wall depending from said end wall, an inside diameter of said tubular side wall being substantially equal to, and greater than, an outside diameter of said open ends of said tubular vessel body, whereby said end caps will fit snugly over said open ends of said vessel body to close said open ends;
   locking structure for securing said end caps over said open ends, said locking structure comprising a circumferential locking groove on an inside surface of said side wall of said end caps, an access opening through said side wall connecting to said circumferential locking groove, and a corresponding circumferential locking groove on an exterior surface of said tubular vessel body substantially adjacent to said open ends, said circumferential locking grooves on said end caps and said vessel body being juxtaposed when said end caps are fitted over said open ends of said vessel body, said locking grooves being substantially semi-circular in cross-section and forming, when juxtaposed, a circumferential locking channel substantially circular in cross-section;
   flexible rods adapted for insertion into said locking channel through said access opening, said flexible rods being substantially circular in cross-section and having a diameter substantially equal to, and less than, a diameter of said locking channel, whereby said flexible rods will fit snugly within said locking channels to prevent removal of said end caps from said open ends of said tubular vessel body, and internal operating pressures exerted on said end caps will be dispersed across the semi-circular surface area of said locking channels to prevent stress fractures of said plastic, and whereby a non-toxic fastening structure for said end cap will be formed.

11. The water filtration device of claim 10, further comprising O-rings mounted to an inside surface of said side walls of said end caps, said O-rings being adapted to form a water tight seal between said open ends and adjacent portions of said end caps to prevent leakage through said joint.

12. The water filtration device of claim 11, wherein said plastic is polyvinyl chloride.

13. A non-toxic method for securing a plastic end cap having a sidewall over an open end of a plastic water filtration device containing a filter medium, said method comprising the steps of:
   fitting said end cap over said open end with said side wall nesting over said open end, an inside surface of said side wall of said end cap having a locking groove, an outside surface of said open end having a locking groove, said fitting step further comprising the step of juxtaposing said locking groove on said end cap with said locking groove on said open end to form a locking channel;
   threading a flexible rod through an access opening in said side wall of said end cap and into said locking channel of said juxtaposed locking grooves, said flexible rod having cross-sectional dimensions substantially equal to, and less than, the cross-sectional dimensions of said locking channel, whereby said flexible rod will prevent the removal of said end cap from said open end, and said water filtration device and filter medium carbon within said water filtration device will be free of toxic substances released by curing adhesives.

* * * * *